US007685985B2

(12) United States Patent
Madeira

(10) Patent No.: US 7,685,985 B2
(45) Date of Patent: Mar. 30, 2010

(54) AIR INTAKE DEVICE FOR AN INTERNAL COMBUSTION ENGINE

(75) Inventor: Pedro Miguel Pereira Madeira, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 218 days.

(21) Appl. No.: 11/777,526

(22) Filed: Jul. 13, 2007

(65) Prior Publication Data

US 2008/0011259 A1 Jan. 17, 2008

(30) Foreign Application Priority Data

Jul. 14, 2006 (DE) .................. 20 2006 011 026 U

(51) Int. Cl.
*F02M 35/00* (2006.01)
(52) U.S. Cl. ............................ 123/184.21; 123/184.61
(58) Field of Classification Search ..............................
123/184.21–184.61, 198 E; 264/68; 156/73.5
See application file for complete search history.

(56) References Cited

U.S. PATENT DOCUMENTS

| 4,577,596 | A | | 3/1986 | Senga | |
|---|---|---|---|---|---|
| 4,601,927 | A | | 7/1986 | Durfee | |
| 5,813,380 | A | * | 9/1998 | Takahashi et al. ...... | 123/184.55 |
| 6,666,182 | B2 | | 12/2003 | Schermuly et al. | |
| 6,802,293 | B2 | * | 10/2004 | Iwata et al. ............ | 123/184.42 |
| 6,902,778 | B2 | * | 6/2005 | Marentette et al. ............ | 428/17 |
| 2004/0200450 | A1 | * | 10/2004 | Tanikawa et al. ....... | 123/184.42 |
| 2006/0037575 | A1 | * | 2/2006 | Enokida et al. ........ | 123/184.42 |

FOREIGN PATENT DOCUMENTS

| DE | 199 44 855 A1 | 3/2001 |
|---|---|---|
| EP | 1 264 982 A | 12/2002 |
| EP | 1 392 961 B1 | 3/2004 |
| EP | 13 92 961 B1 | 3/2004 |
| EP | 1 452 722 A1 | 9/2004 |
| FR | 2 690 376 A1 | 10/1993 |
| JP | 2003-314391 A | 11/2003 |
| JP | 2005-319613 A | 11/2005 |
| WO | WO 92/12845 A2 | 8/1992 |

OTHER PUBLICATIONS

European Search Report dated Jan. 19, 2009 with partial English translation (Six (6) pages).
European Search Report dated Jun. 17, 2009 (Ten (10) pages).
German Search Report dated Mar. 22, 2007 (Four (4) pages).

* cited by examiner

*Primary Examiner*—M. McMahon

(57) ABSTRACT

An air intake device for an internal combustion engine formed of at least two plastic component parts assembled to form a combustion air flow channel. The plastic component parts have communicating weld surfaces lying radially outside the flow channel, along which the plastic component parts are joined to each other by friction welding, and at least two communicating weld surfaces with different radial distances from the flow channel are provided on both the first and the second plastic component parts.

16 Claims, 6 Drawing Sheets

AIR INTAKE DEVICE FOR AN INTERNAL COMBUSTION ENGINE

BACKGROUND OF THE INVENTION

The invention relates to an air intake device for an internal combustion engine.

U.S. Pat. No. 6,666,182 (=DE 199 44 855) describes an air intake device for an internal combustion engine, in which the plastic component parts of the housing are joined to each other by friction welding. These are component parts of intake pipes having communicating weld surfaces, partly on their end faces and partly over their axial length, which lie adjacent one another in the assembled state and are joined to each other by friction welding. These weld surfaces consist of flange-like radial expansions in the wall of the plastic housing part to provide an enlarged surface for welding. Two of the plastic component parts to be joined are first aligned in relation to each other to bring the communicating weld surfaces into contact. A bonding force is then applied to the weld surfaces and a relative movement imparted to the housing parts until the parts are friction welded together. The same procedure is used for the third plastic component part, which is joined to the weldment assembly of the first two housing component parts, again by friction welding.

European patent publication no. EP 1,392,961 B1 describes the use of friction welding to join two plastic component parts of an air intake device, between which flow channels are formed for the combustion air. The plastic component parts are configured as half shells, which have webs extending axially on both sides, outside the flow channel located therebetween. These webs are welded together. Thus, a very long axial weld seam extending over the length of the flow channel on both sides of the channel is obtained.

SUMMARY OF THE INVENTION

It is an object of the present invention to provide an improved air intake device for internal combustion engines.

Another object of the invention is to provide an air intake device composed of a plurality of assembled plastic component parts having a secure and permanent joint between plastic component parts.

A further object of the invention is to provide an air intake device having a simple and economical construction.

These and other objects are achieved in accordance with the present invention by providing an air intake device for an internal combustion engine comprising at least two plastic component parts assembled together to form a combustion air flow channel having an axis, the plastic component parts having communicating weld surfaces which lie radially outside the flow channel and along which the plastic component parts are joined by friction welding, wherein at least two mutually spaced apart weld surfaces are provided on both a first one of the plastic component parts and a second one of the plastic component parts, and the spaced apart weld surfaces lie in planes which form an angle with the flow channel axis. Advantageous further embodiments and refinements also are described hereinafter.

According to a first aspect of the invention, the air intake device comprises at least two plastic component parts that can be joined by friction welding. Both of these plastic component parts have two spaced-apart weld surfaces lying in planes forming an angle with the longitudinal axis of the flow channel, which is guided through the air intake device. Thus, the joint between the two plastic component parts is formed by at least two weld surfaces, so that additional static and dynamic forces can be transmitted between the plastic component parts and tightness is improved. Preferably at least one weld surface assumes not only a supporting and holding function but also the function of making the flow channel flow-tight toward the outside. The planes of the weld surfaces preferably lie at least in part at a 90° angle to the flow channel axis, making it possible to realize relatively short weld surfaces with optimal force transmission and sealing function.

According to one advantageous embodiment, the weld surfaces have different radial distances from the flow channel. This has the advantage that tightness is ensured even if one of the weld surfaces begins to leak, in which case the remaining second weld surface assumes the sealing function. Because of the different radial distances of the weld surfaces from the flow channel through the air intake device, each of the weld surfaces encompasses the flow channel, e.g., annularly or partially annularly, to ensure increased reliability at least in the segment with two radially spaced-apart weld surfaces.

The additional weld surface has the effect of distributing the forces, such that the support forces between the plastic component parts acting on each individual weld surface are correspondingly reduced. As a result, any vibrations or disturbances acting on the air intake device cause correspondingly reduced forces per weld surface, thereby increasing the stability and delaying the aging process.

According to an advantageous further development, the radially spaced-apart weld surfaces lie in a common plane that extends transversely to the flow channel through the air intake device. It is also possible, however, to offset the weld surfaces in both radial and axial direction, such that the weld surfaces lie in different planes, each extending transversely to the flow channel and oriented particularly parallel to each other. It is furthermore possible to arrange these different planes, in which the radially and/or axially spaced-apart weld surfaces lie, at an angle to each other, so that the planes form different angles in relation to the flow channel. Finally, an embodiment may be realized in which the end face of the flow channel is covered by a flange of a second plastic component part, and at least a portion of the weld surfaces is provided in the area of this flange and welded to communicating weld surfaces formed on the first plastic component part having the flow channel.

Particularly if the weld surfaces lie in a common plane, it may be advantageous to arrange the weld surfaces concentrically to each other so that the weld surfaces have the same radial distance in relation to each other, at least over a certain angular section. As seen in circumferential direction, the weld surfaces on the plastic component part can extend over only a partial section or over the entire circumference. The weld surfaces may also extend concentrically over partial areas and non-concentrically over other partial areas.

If the weld surfaces are arranged in different planes transversely to the flow channel, a shoulder is formed between the weld surfaces, which forms a stop for the communicating plastic component part having the corresponding weld surfaces to be joined.

According to yet another advantageous embodiment, connecting ribs are provided on the plastic component part between the radially inner and the radially outer weld surfaces. These ribs extend like rays, for example, that is to say in radial direction, and help stabilize both the plastic component part per se and the weld. The connecting ribs may optionally form a weld surface, as well.

According to a second aspect of the invention, the air intake device comprises at least three plastic component parts, which are joined by friction welding. To this end, the plastic component parts have communicating weld surfaces that are adjacent one another and are friction welded together by a relative movement between two plastic component parts. According to the invention it is provided that a first plastic component part that is joined to the two additional plastic component parts has weld surfaces relative to the other plastic component parts which lie in planes forming an angle with each other. This provides a friction weld in different directions making possible particularly a 3-dimensional assembly with fixed joints between different plastic component parts.

The friction welding process is preferably carried out in several successive steps by first friction welding the central plastic component part to a first adjacent plastic component part and then welding the assembly of the first and the second plastic component parts to the third plastic component part. Since the welds lie in different planes arranged at an angle to each other, the relative movement between the components required for the friction welding must also occur along each of these planes.

In yet another advantageous embodiment the weld surfaces on the first plastic component part, by which the first plastic component part is friction welded to the other components, are arranged immediately adjacent to each other. For example, a pipe flange on the central plastic component part can have several weld surfaces that are arranged at an angle to each other. It is possible, for example, to provide a weld surface at one end face of the central plastic component part, another weld surface extending along the circumference of the end face and/or yet another weld surface oriented in radial direction. The planes through the weld surfaces each form an angle with each other, such that the plane along the circumference should be understood as either a curved plane or as the sum of all tangential planes extending along the circumference covered by the weld surface.

In the above embodiment, the first plastic component part may be joined to three other plastic component parts by friction welding. It may, however, also be joined to only two other components. It is furthermore possible to place the various weld surfaces on the first plastic component part at different positions.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
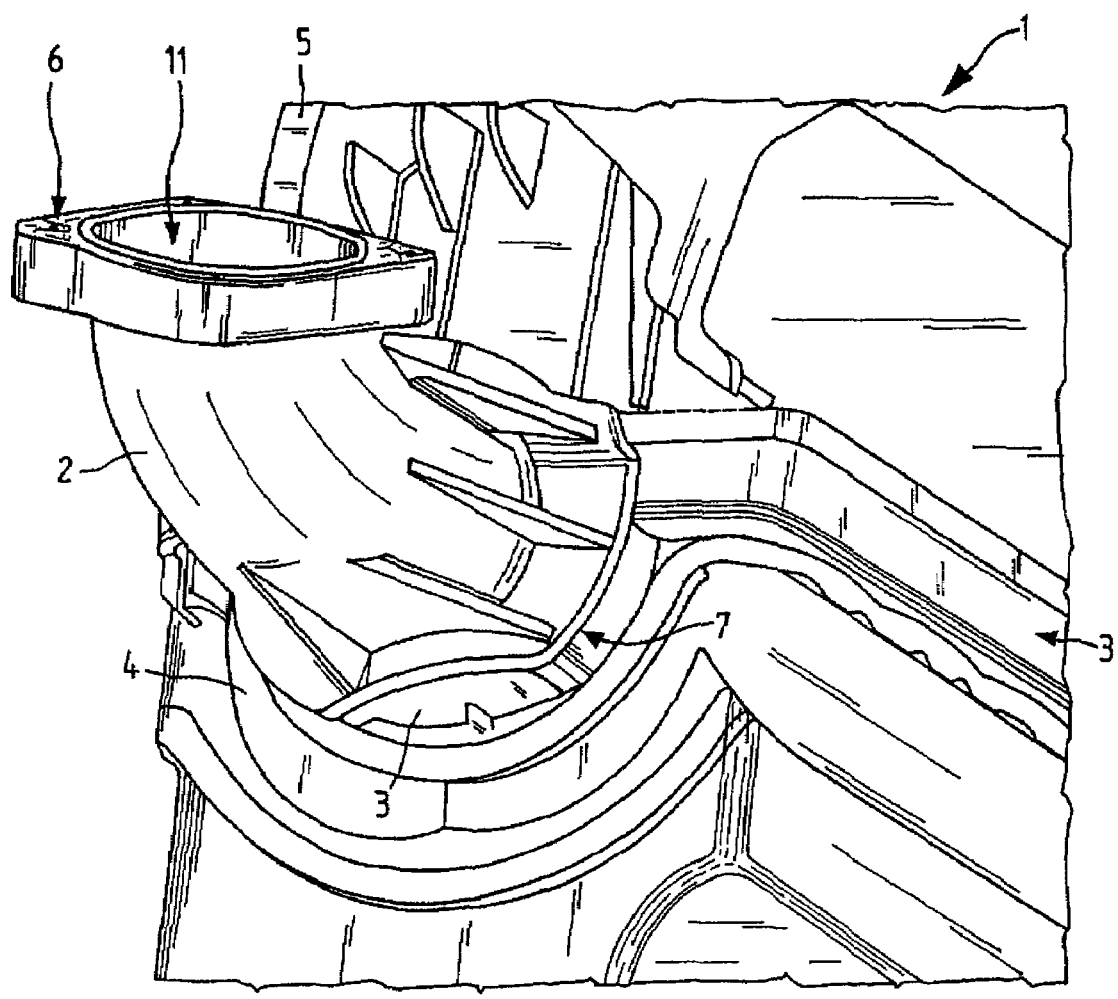
FIG. 1 is a perspective view of an air intake device for an internal combustion engine having a connecting pipe for receiving a butterfly valve, the connecting pipe being a plastic component part that is joined by friction welding to other plastic housing parts of the air intake device.

In the figures, like parts are identified by the same reference numerals.

FIG. 1 shows an air intake device 1 for an internal combustion engine comprising a plurality of plastic component parts 2, 3, 4 and 5, which are produced particularly by injection molding. A first plastic component part 2 forms a connecting pipe with a flow channel 11, in which is provided particularly a butterfly valve and which continues through the other plastic component parts. The plastic component parts 2 through 5 are at least partly joined to each other by friction welding. To this end, adjacent contact surfaces, which form weld surfaces, are joined by friction welding by setting two plastic component parts that are to be welded together into vibration in relation to each other in the welding plane. This causes the weld surfaces to be heated by friction and to be welded together. In the present example, the end face 7 opposite the free end face 6 of the first plastic component part 2 is friction welded in different planes to the three other plastic component parts 3, 4 and 5.

Figure 2:
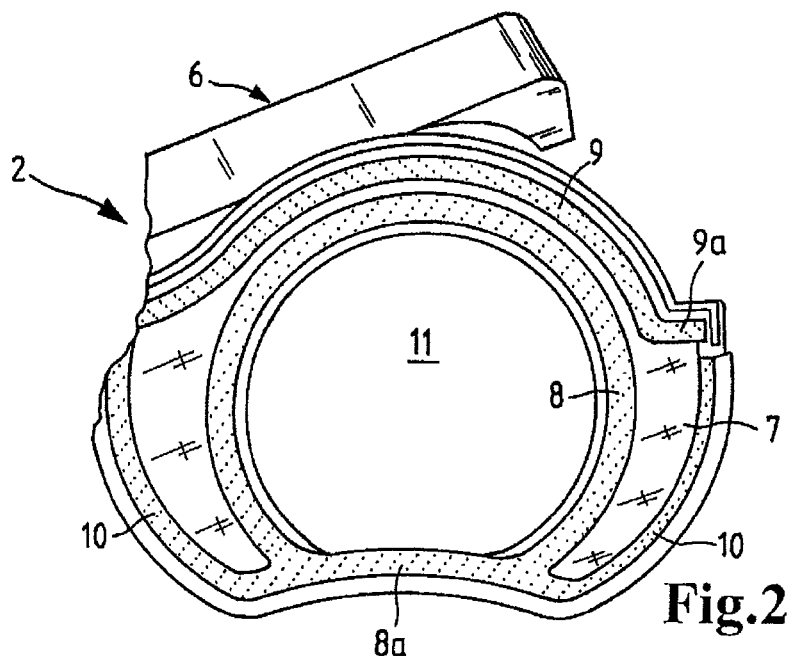
FIGS. 2 and 3 show two different views of the connecting pipe.
Figure 3:
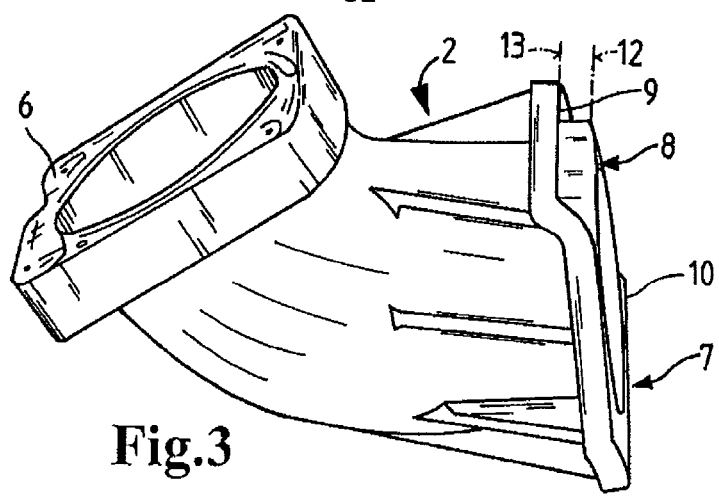

FIGS. 2 and 3 show the first plastic component part 2 in detail. FIG. 2 shows the end face 7 by which the plastic component part 2, which is embodied as a connecting pipe, is friction welded to the next plastic component part 3. For this purpose, the end face 7 has weld surfaces 8, 9 and 10, which cooperate with communicating weld surfaces on the other plastic component part 3 and are welded together with the communicating weld surfaces there. The weld surfaces 8 through 10 are strip-shaped and extend along the end face 7 in circumferential direction around the flow channel 11, which is guided through the plastic component part 2. A first weld surface 8 extends over 36° and encloses the flow channel 11 completely. Radially outwardly offset in relation to the first weld surface 8, a second weld surface 9 is provided, which in contrast to the first weld surface 8 extends only over a partial area in circumferential direction, namely over approximately 180°. In partial sections, the second weld surface 9 extends concentrically to the first weld surface 8. In the area of its end faces, however, the second weld surface 9 has a radially outwardly directed section 9a. All the areas of the second weld surface 9 are spaced apart from the first weld surface 8.

In addition, a third weld surface 10 is provided, which in mirror symmetrical configuration has an arm on each of two sides of a central section 8a of the first weld surface 8 branching off from this central section 8a. The third weld surface 10—with the exception of its connecting section to the central section 8a—also extends at a radial distance from the first inner weld surface 8. The free end faces of the third weld surface 10 end at the height of the radially outwardly directed section 9a of the second weld surface 9.

As may be seen in FIG. 3, the weld surfaces 8 and 10 on the one hand and the weld surface 9 on the other lie in different but parallel planes 12 and 13, which extend through the flow channel 11, transverse to the flow direction. The plane 12, in which the weld surfaces 8 and 10 lie, extends along the outer end face 7 of the plastic component part 2. The other plane 13 is slightly offset rearwardly thereto, forming a shoulder between the weld surface 9 and the two other weld surfaces 8 and 10. This shoulder simultaneously forms a stop for the complementary additional plastic component part, which can be joined to the first plastic component part 2 by friction welding.

Figure 4:
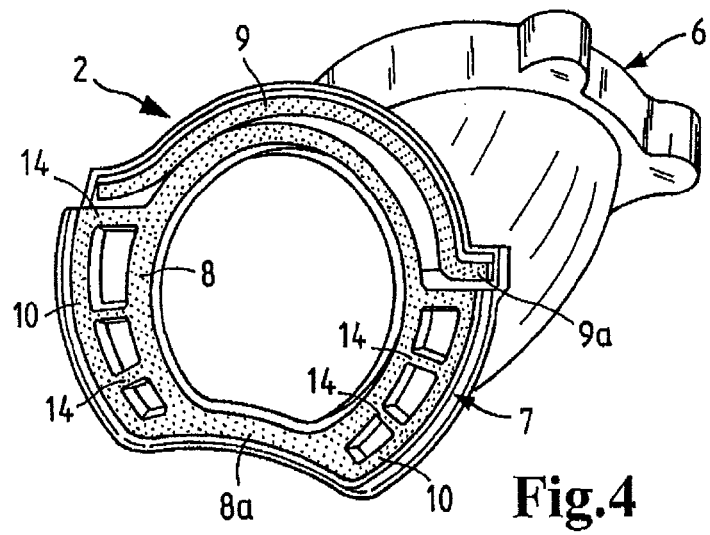
FIG. 4 shows an alternative embodiment of the connecting pipe.

FIG. 4 shows another variant of the plastic component part 2. The basic construction of the end face 7 with its weld surfaces 8, 9 and 10 corresponds to the preceding embodiment depicted in FIGS. 2 and 3. The difference is that the inner, annular weld surface 8 is connected to the outer, partially annular weld surfaces 10 by radially extending ribs 14. In the embodiment shown, a plurality of such ribs 14 are provided, which extend at different angular distances between the weld surfaces 8 and 10, such that an opening is left free between two adjacent ribs 14. The ribs 14 lie in the same plane as the weld surfaces 8 and 10. The ribs 14 can likewise function as weld surfaces.

Figure 5:
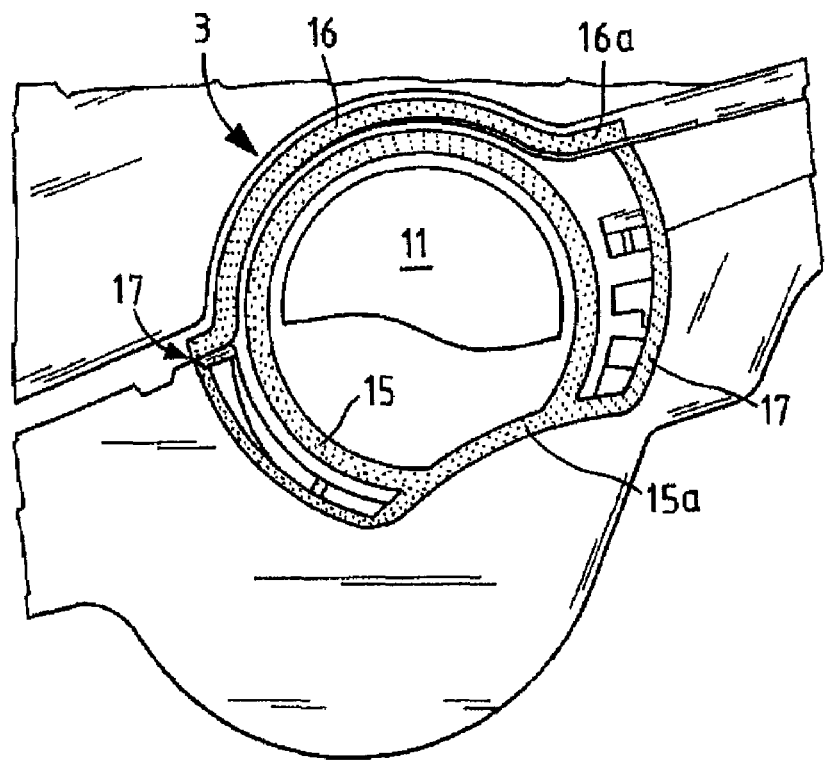
FIGS. 5 and 6 show two different views of an additional plastic component part that can be joined to the connecting pipe by friction welding.
Figure 6:
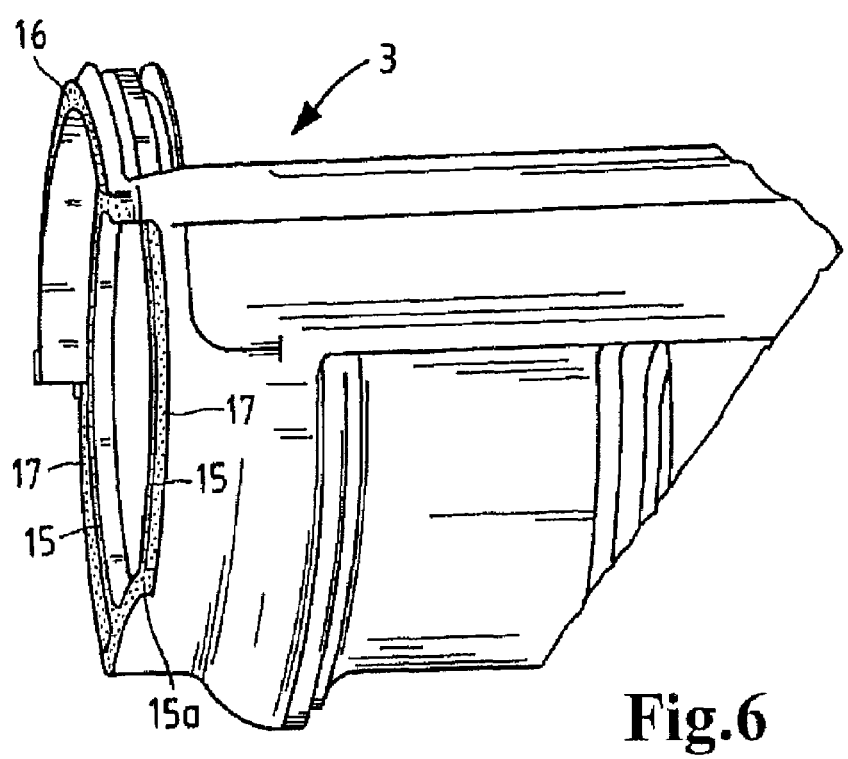

FIGS. 5 and 6 show different views of the additional plastic component part 3, which is friction welded to the first plastic component part 2. One end face of the additional plastic component part 3 has communicating strip-shaped weld surfaces 15 through 17, which are complementary to the weld surfaces 8 through 10 of the first plastic component part 2. The inner weld surface 15 is annular and encloses the flow channel 11, which continues in the interior of the plastic component part 2. The other weld surfaces 16 and 17 are offset radially outwardly in relation to the inner weld surface 15, such that the weld surfaces 17 branch off on both sides of a section 15a of the inner annular weld surface 15. The other radially outwardly offset weld surface 16 lies on the side opposite section 15a and extends over a partial area in circumferential direction. End face sections 16a of the weld surface 16 extend radially outwardly, such that the free ends of the weld surfaces 17 lie directly adjacent the radial sections 16a.

As may be seen in FIG. 6, the weld surfaces 15 and 17 lie in a common plane. The additional weld surface 16 lies in a plane that is axially outwardly offset thereto. The axial offset between the weld surfaces is complementary to the arrangement of the weld surfaces 8 through 10 on the end face 7 of the plastic component part 2 (FIG. 3).

Figure 7:
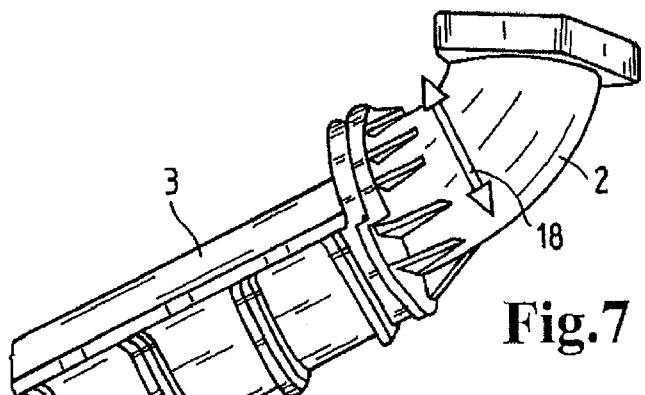
FIGS. 7 to 9 illustrate the connecting pipe during the friction welding process in different assembly stages as it is joined to a total of three other plastic component parts of the air intake device, each of which is friction welded to the connecting pipe in a different plane.
Figure 8:
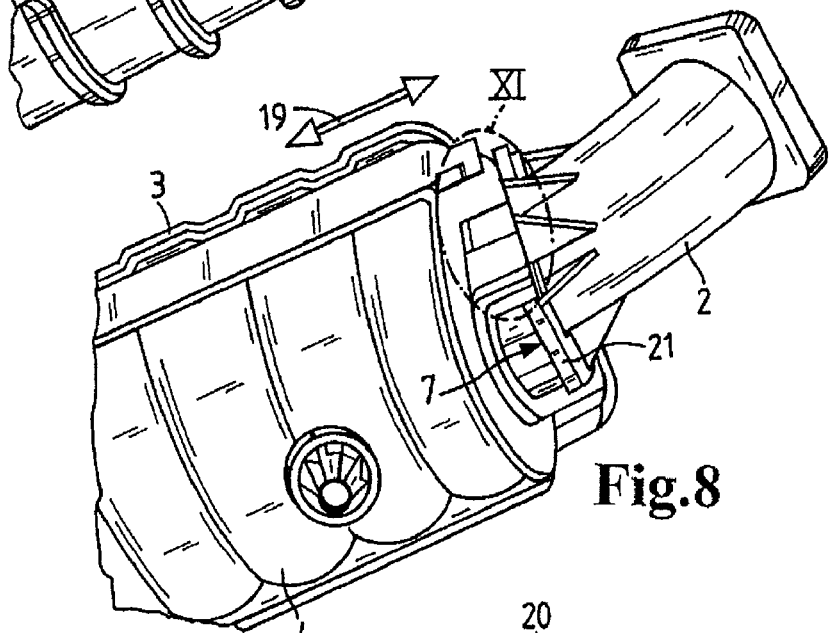
Figure 9:
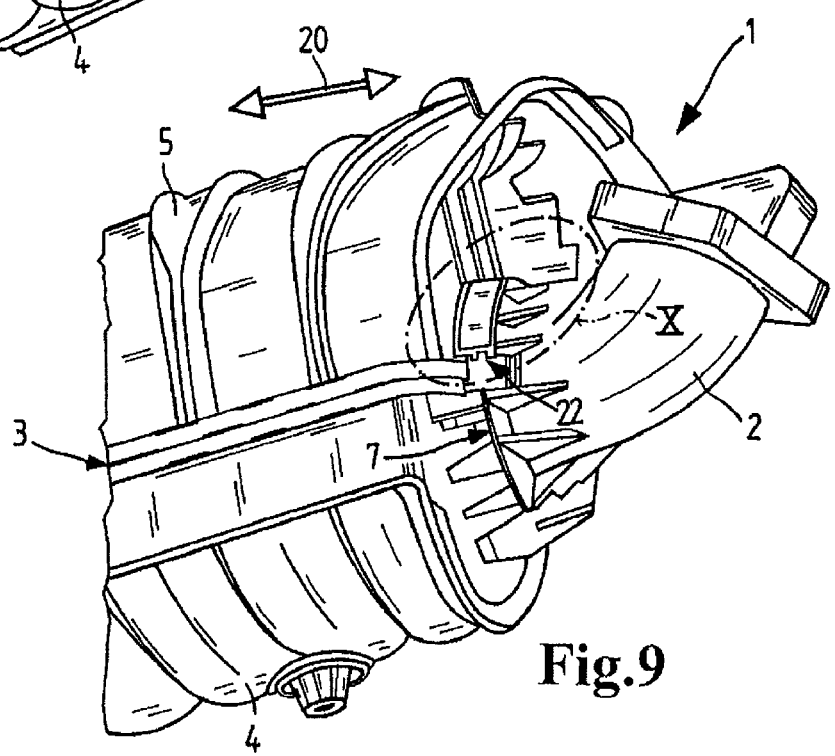

The following FIGS. 7 through 9 illustrate the process of friction welding the plastic component part 2 to the other plastic component parts 3 through 5 in three different steps. In a first process step illustrated in FIG. 7, the plastic component part 2 is friction welded to the second plastic component part 3. For this purpose, the plastic component parts 2 and 3 with their complementary weld surfaces are placed end to end and are set into relative oscillations or vibrations in the direction of arrow 18. The plane between the weld surfaces of the adjacent plastic component parts 2 and 3 extends through the plastic component parts perpendicularly to the axis of the flow channel. The vibration direction indicated by the direction of arrow 18 lies in this plane.

In the subsequent process step illustrated in FIG. 8, the assembly of the now friction-welded plastic component parts 2 and 3 is welded to the additional component 4. To this end, the component 4 is placed on a weld surface on component 2 extending in circumferential direction at the height of the end face 7. This weld surface 21 is located on the circumference in the area of the end face of the plastic component part 2. The complementary, associated weld surface on the component 4 encompasses the circumferential weld surface 21. The friction weld movement occurs in axial direction as indicated by arrow 19.

In the third process step for joining the plastic component part 2 to the last plastic component part 5, an additional weld surface 22, which extends over a partial section of the circumference and is oriented in radial direction, is friction welded to a communicating weld surface on the plastic component part 5. To this end, the plastic component parts involved are set into relative vibrations in the direction of arrow 20. A relative vibration movement in circumferential direction may optionally also be considered. Thereafter the plastic component parts 3, 4 and 5 are friction welded to the first plastic component part 2, so that all the components form a firm assembly.

Figure 10:
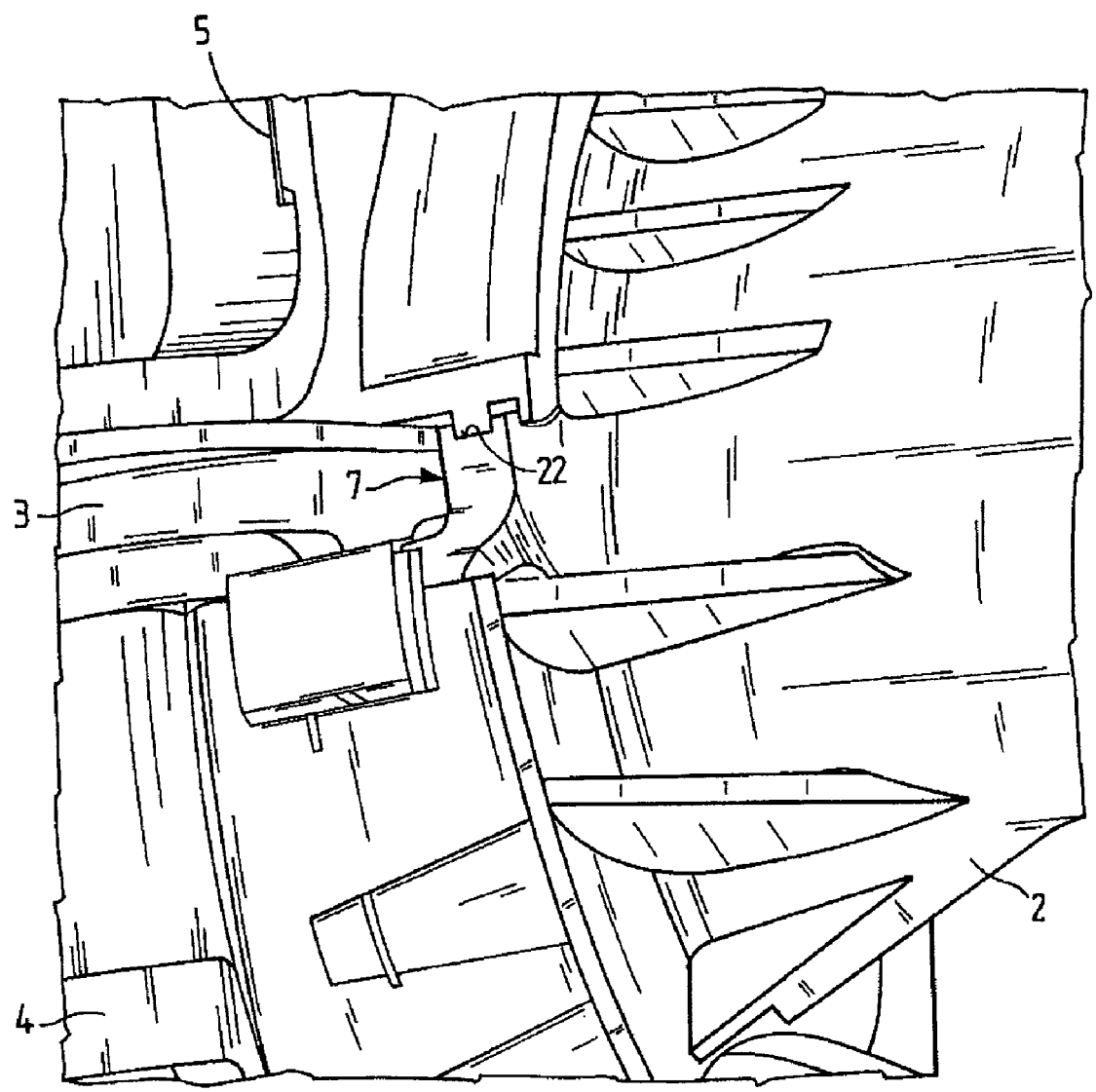
FIG. 10 shows a detail X of FIG. 9 illustrating radial weld surfaces between two plastic components.

FIG. 10 is an enlarged view of detail X in FIG. 9 showing the radially oriented weld between the plastic component parts 2 and 5. The weld surface 22 on the plastic component part 2 extends in circumferential direction over a partial section of the circumference and is directed radially outwardly. In this weld surface 22, a groove is formed in the margin, in which a communicating projection formed on the plastic component part 5 engages with a positive fit. This projection on the plastic component part 5 forms the pertaining weld surface.

Figure 11:
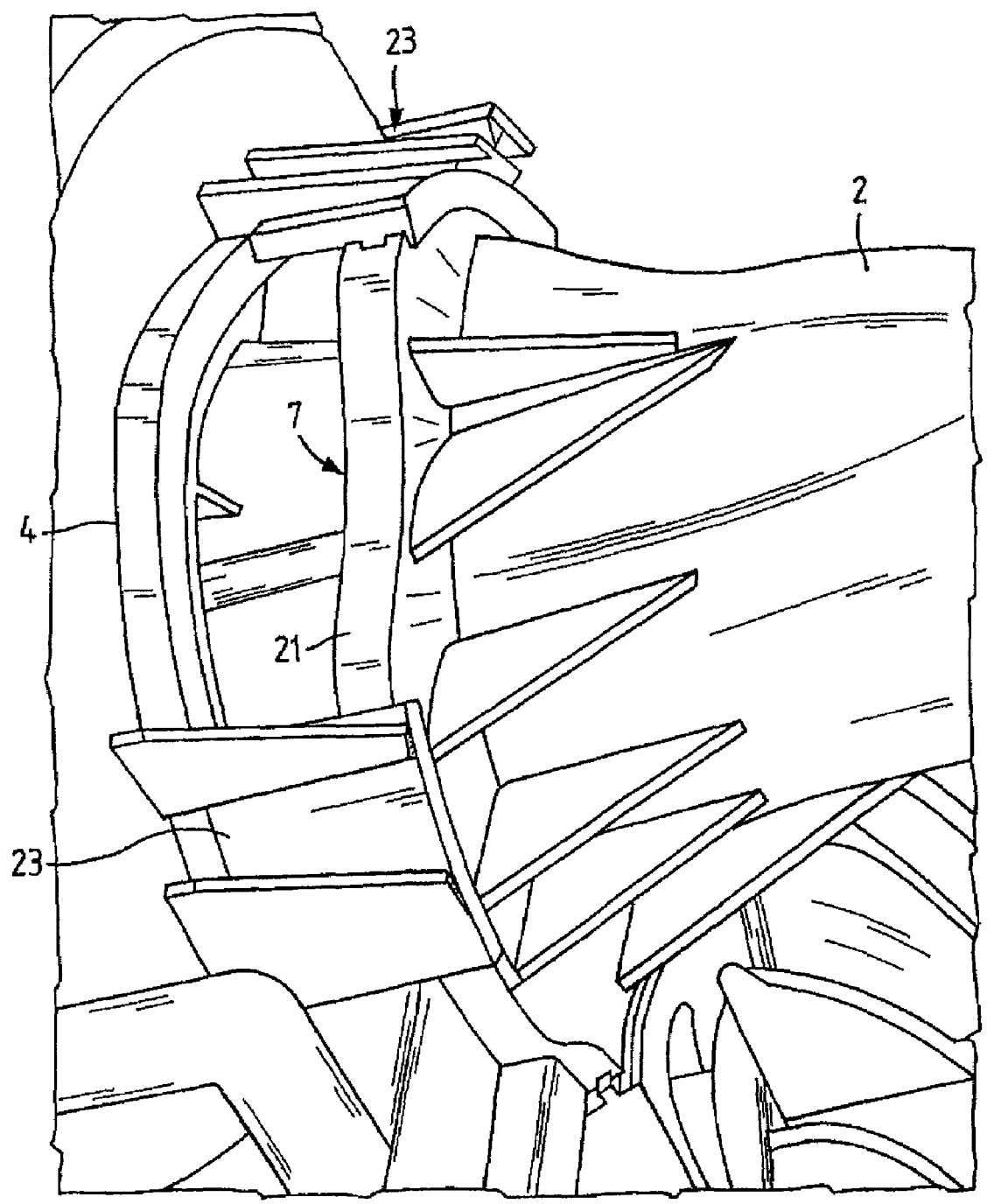
FIG. 11 shows a detail XI of FIG. 8 illustrating a joint in circumferential direction between two plastic component parts.

FIG. 11 is an enlarged view of detail XI of FIG. 8. Visible are axially protruding housing sections 23 on the end face of the plastic component part 4. The housing sections 23 form weld surfaces on their inside and with this inside contact the communicating circumferential weld surface 21 on the end face 7 of the plastic component part 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air intake device for an internal combustion engine comprising at least two plastic component parts assembled together to form a combustion air flow channel having an axis, said plastic component parts having communicating weld surfaces which lie radially outside the flow channel and along which the plastic component parts are joined by friction welding, wherein at least two pairs of mutually spaced apart weld surfaces comprise first and second weld surfaces of a first one of the plastic component parts and corresponding first and second weld surfaces of a second one of the plastic component parts, and said at least two pairs of mutually spaced apart weld surfaces lie in planes which form an angle with the flow channel axis, the pair of first surfaces extending concentrically with and being at least partially encompassed by the pair of second surfaces.

2. An air intake device according to claim 1, wherein the first weld surfaces are disposed at a different radial distance from the flow channel than the second weld surfaces.

3. An air intake device according to claim 2, wherein the first and second weld surfaces of the at least two component parts lie in a common plane transverse to the flow channel.

4. An air intake device according to claim 1, wherein the first weld surfaces of the at least two component parts are axially spaced apart from the second weld surfaces.

5. An air intake device according to claim 4, wherein the weld surfaces lie in different planes transverse to the flow channel, such that a shoulder is formed between the weld surfaces.

6. An air intake device according to claim 1, wherein the weld surfaces on a plastic component part are disposed concentrically to each other.

7. An air intake device according to claim 1, wherein a weld surface on one plastic component part extends only partially around a perimeter of the one plastic component.

8. An air intake device according to claim 1, wherein a weld surface on one plastic component part extends around an entire perimeter of the one plastic component.

9. An air intake device according to claim 1, wherein connecting ribs are provided on one plastic component part between a radially inner and a radially outer weld surface.

10. An air intake device according to claim 9, wherein the connecting ribs also form a weld surface.

11. An air intake device according to claim 1, wherein at least one weld surface has a radially oriented section.

12. An air intake device for an internal combustion engine according to claim 1, comprising at least three plastic component parts assembled to form a combustion air flow channel, said plastic component parts having communicating weld surfaces which are joined together by friction welding, wherein the weld surfaces on a first one of the plastic component parts that is joined to two others of the plastic component parts lie in planes which form an angle to each other.

13. An air intake device according to claim 12, wherein the weld surfaces on the first plastic component part are arranged directly adjacent one another.

14. An air intake device according to claim 12, wherein one weld surface is disposed on an end face of the first plastic component part, and another weld surface is one of disposed on a perimeter and extends in a radial direction.

15. An air intake device according to claim 14, wherein a groove is formed in a weld surface which extends in the radial direction.

16. An air intake device according to claim 12, wherein the first plastic component part is joined to three other plastic component parts.

* * * * *